US00RE45024E

(19) United States
(12) Reissued Patent
Ball

(10) Patent Number: US RE45,024 E
(45) Date of Reissued Patent: Jul. 22, 2014

(54) ROUND WALL-MOUNTED HYDRANT HOUSING FOR FREEZELESS WALL HYDRANTS

(75) Inventor: William T. Ball, Colorado Springs, CO (US)

(73) Assignee: WCM Industries, Inc., Colorado Springs, CO (US)

(21) Appl. No.: 13/157,183

(22) Filed: Jun. 9, 2011

Related U.S. Patent Documents

Reissue of:
(64) Patent No.: 7,543,602
Issued: Jun. 9, 2009
Appl. No.: 10/408,603
Filed: Apr. 7, 2003

(51) Int. Cl.
*F16L 5/00* (2006.01)

(52) U.S. Cl.
USPC ..... 137/359; 137/360

(58) Field of Classification Search
USPC ..... 137/272, 294, 296, 301, 360, 527.6, 137/527, 527.2, 359; D23/234; 285/7; 4/507, 323; 312/139.1; 16/345; 454/94
See application file for complete search history.

(56) References Cited

U.S. PATENT DOCUMENTS

| | | | | |
|---|---|---|---|---|
| 556,500 | A | 3/1896 | Fox | |
| 616,542 | A | 12/1898 | Koehner | |
| 695,147 | A | 3/1902 | Denney | |
| 1,096,278 | A | 5/1914 | Sutton | |
| 1,310,521 | A | 7/1919 | Crall | |
| 1,774,307 | A | 8/1930 | Willig | |
| 3,269,587 | A | 8/1966 | Svenson | |
| 3,283,093 | A | 11/1966 | Bishop | |
| 3,291,927 | A | 12/1966 | Riley et al. | |
| 3,706,184 | A | 12/1972 | Tucker | |
| 3,721,363 | A * | 3/1973 | Bressler et al. | 220/315 |
| D227,365 | S | 6/1973 | Woodford | |
| D227,366 | S | 6/1973 | Woodford | |
| D236,892 | S | 9/1975 | Carlson | |
| 4,048,050 | A | 9/1977 | Hillman | |
| 4,357,715 | A | 11/1982 | Klawitter | |
| 4,443,894 | A | 4/1984 | Klawitter | |
| D275,512 | S | 9/1984 | Shaw | |
| 4,508,469 | A | 4/1985 | Dumortier | |
| 4,817,991 | A | 4/1989 | Frentzel et al. | |
| 4,863,458 | A | 9/1989 | Bokros | |

(Continued)

FOREIGN PATENT DOCUMENTS

| | | |
|---|---|---|
| CH | 675139 | 8/1990 |
| CH | 675139 A5 * | 8/1990 |

OTHER PUBLICATIONS

Box Hydrants, Wade, 1966, printed on May 23, 2003, 2 pages.
Box Hydrants—Wade 1966.

*Primary Examiner* — Anita M King
(74) *Attorney, Agent, or Firm* — Sheridan Ross P.C.

(57) ABSTRACT

A round wall-mounted housing for use with freezeless wall hydrants that provides a housing of a round configuration. The round configuration allows for easy installation of the round wall hydrant housing in existing panels or walls. To install, an access hole may be drilled into the desired wall or wall panel without the need for chiseling or chipping. The present invention also provides a cover that can remain in an upright, open position. The cover pivots on a pin connection securing it to the housing. The cover has guides with extended slots that allow the cover to swing to and then lock in an open position.

5 Claims, 10 Drawing Sheets

(56) References Cited

U.S. PATENT DOCUMENTS

| | | | |
|---|---|---|---|
| 4,946,434 | A | 8/1990 | Plaisted et al. |
| 5,003,662 | A | 4/1991 | Everts |
| 5,044,396 | A | 9/1991 | Daudet et al. |
| 5,050,632 | A | 9/1991 | Means, Jr. |
| 5,058,946 | A | 10/1991 | Faber |
| 5,078,738 | A | 1/1992 | Couetil |
| 5,237,709 | A | 8/1993 | Byerly et al. |
| 5,653,254 | A | 8/1997 | Condon et al. |
| 5,678,597 | A | 10/1997 | Tuomela et al. |
| 5,690,141 | A | 11/1997 | Creaghe |
| 5,964,246 | A | 10/1999 | Meeker |
| 6,109,297 | A | 8/2000 | Shackelford |
| 6,247,491 | B1 | 6/2001 | Petryna |
| 6,474,365 | B1 | 11/2002 | Brown et al. |
| D470,915 | S | 2/2003 | Ball |
| 6,749,363 | B1 * | 6/2004 | Petersen ..... 404/25 |
| 7,543,602 | B2 | 6/2009 | Ball |
| 2001/0003350 | A1 | 6/2001 | Gandy et al. |

* cited by examiner

ROUND WALL-MOUNTED HYDRANT HOUSING FOR FREEZELESS WALL HYDRANTS

Matter enclosed in heavy brackets [ ] appears in the original patent but forms no part of this reissue specification; matter printed in italics indicates the additions made by reissue.

BACKGROUND OF THE INVENTION

This invention relates generally to wall hydrants and, more particularly, to wall-mounted enclosure boxes used with wall hydrants.

Conventional wall hydrant housings or boxes are often of a square or rectangular configuration, but some have an arcuate configuration. Whether round or rectangular, the mounting hole in a concrete wall must be chiseled to form an opening to fit the hydrant housing. Not only is this labor and time intensive, but such a process often results in an imperfect opening without clean, sharp edges.

In addition, the door or cover to a conventional wall hydrant housing oftentimes will not by itself remain in the upright, open position when the hydrant is in use. As such, access to the hydrant inside the housing is frustrated by the tendency of the cover to move to a closed position unless manually held in an open position.

It is therefore a principal object of this invention to provide a wall hydrant housing that can be easily installed into an existing wall.

A further object of this invention is to provide a wall hydrant housing that can be installed without the need for chiseling or chipping of the mounting wall.

Still a further object of this invention is to provide a wall hydrant housing with a cover that does not hamper access to the hydrant inside.

These and other objects will be apparent to those skilled in the art.

BRIEF SUMMARY OF THE INVENTION

The present invention is directed towards round wall-mounted housings for use with freezeless wall hydrants.

The present invention utilizes a *cylindrical* housing of a round configuration. The round configuration allows for easy installation of the round wall hydrant housing in existing panels or walls. To install, an access hole is drilled into the desired wall or wall panel without the need for chiseling or chipping.

The present invention also utilizes a cover that can remain by itself in an open position when the hydrant is operated. The cover pivots on a pin connection securing it to the housing. The cover has guides with extended slots that allow the cover to swing to and then lock in an open position.

DESCRIPTION OF THE PREFERRED EMBODIMENTS

Figure 1:
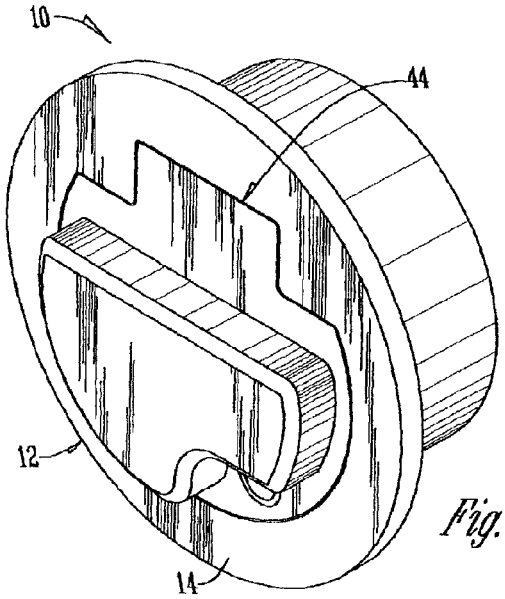
FIG. 1 is a frontal perspective view of the present invention with the cover installed.
Figure 2:
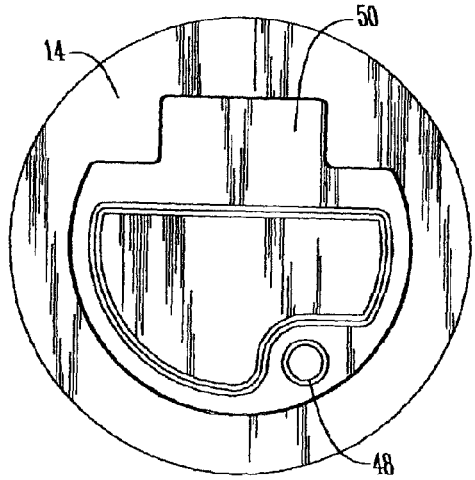
FIG. 2 is a front elevational view thereof.
Figure 3:
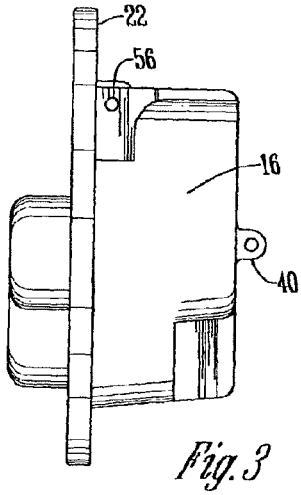
FIG. 3 is a side elevational view thereof, as seen from the right-hand side of FIG. 2.
Figure 4:
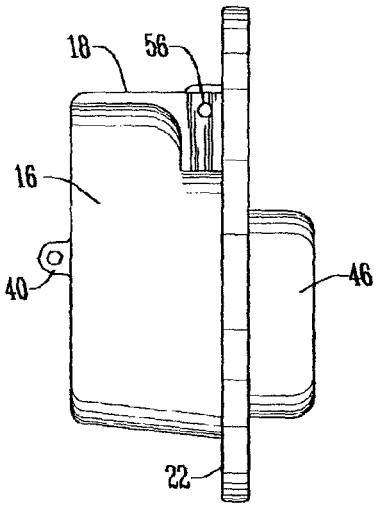
FIG. 4 is a side elevational view thereof opposite to FIG. 3.
Figure 5:
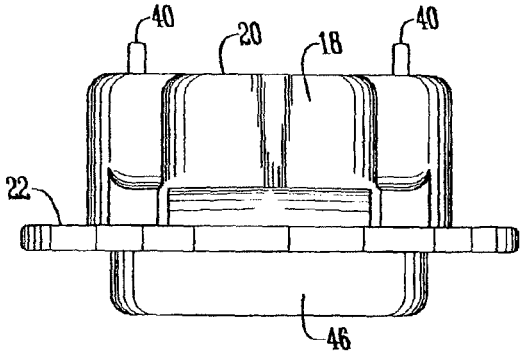
FIG. 5 is a top plan view thereof.
Figure 6:
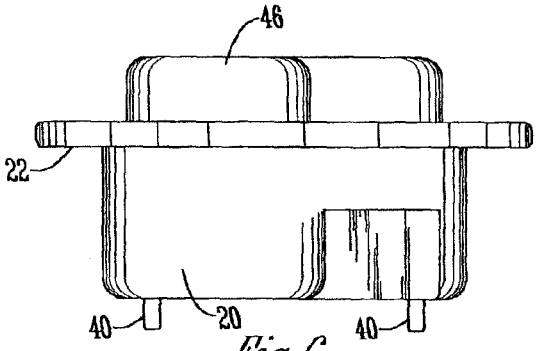
FIG. 6 is a bottom plan view thereof.
Figure 7:
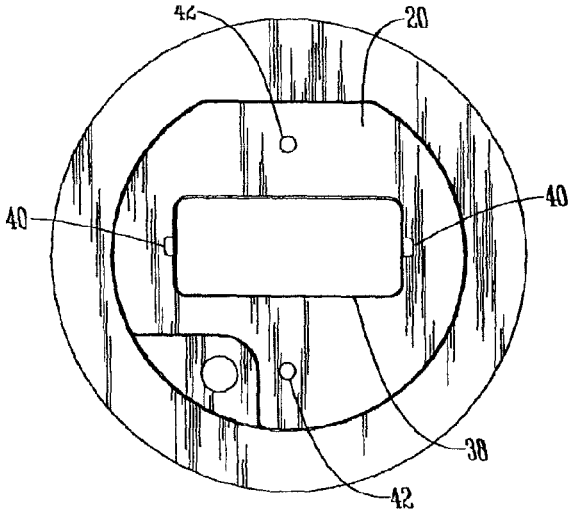
FIG. 7 is a rear elevational view thereof.
Figure 8:
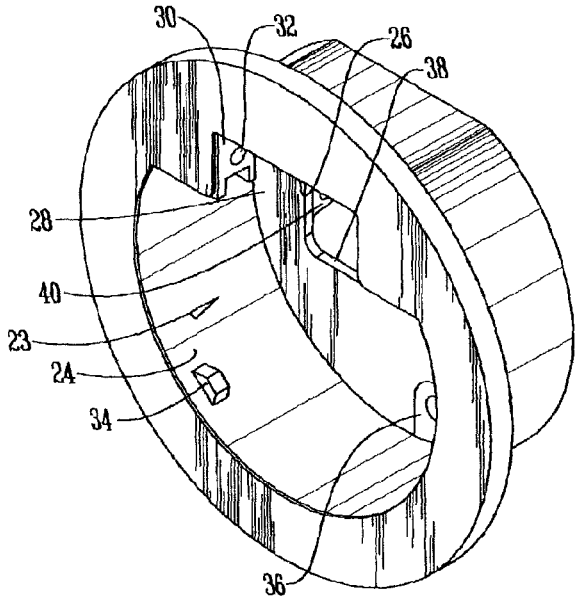
FIG. 8 is a frontal perspective view of the present invention with the cover removed.

With reference to FIGS. 1-7, the numeral 10 designates a housing assembly 10 including a housing 12, having a flat front surface 14, a side surface 16, a flat top surface 18, and a rear surface 20. The front surface 14 is larger in diameter than the rear surface 20, and is the outer surface of flange 22 located around the front of housing interior 23 (FIG. 8). As also shown in FIG. 8, housing interior 23 has an interior side surface 24, an interior top surface 26, and an interior rear surface 28. Housing 12 also has opposite shoulders 30 each having a pin bore 32. Two cover stops 34 protrude from the interior side surface 24 of the housing 12 (FIG. 8). A lock bore 36 is located towards the bottom of interior side surface 24 to receive a conventional lock unit (not shown). As shown in FIG. 7, rear surface 20 of housing 12 has a rectangular-shaped opening 38. Lugs 40 reside on opposite sides of rear opening 38, and hydrant mounting holes 42 are located above and below rear opening 38.

Housing 12 is of a cast construction and may be made of any metal or alloy. In the preferred embodiment, housing 12 is made of cast aluminum. All of the features described above are integrated into the casting. Pin bores 32 may be drilled to achieve a specific tolerance, and lock bore 36, lugs 40 and mounting holes 42 may be tapped to achieve specific threads.

With reference to FIGS. 1-7, the housing assembly 10 also includes a cover 44. Cover 44 may include a domed portion 46, which helps to accommodate certain models of hydrants. Alternatively, cover 44 may be flat, without domed portion 46, depending upon the specific hydrant used. Cover 44 has a lock bore 48 positioned to be in alignment with lock bore 36 on housing 12 when the cover 44 is affixed to the housing 12. Cover 44 also includes a flat hinge portion 50. As shown in FIGS. 10-13, hinge portion 50 has a side surface 52 with a slot 54.

Cover 44 is of a cast construction and may be made of any metal or alloy. To prevent potential galvanic corrosion, cover 44 should be made of the same material as the housing 12. In the preferred embodiment, cover 44 is made of cast aluminum. All of the features described above are integrated into the casting. Slot 54 may be milled to achieve a specific tolerance.

Figure 9:
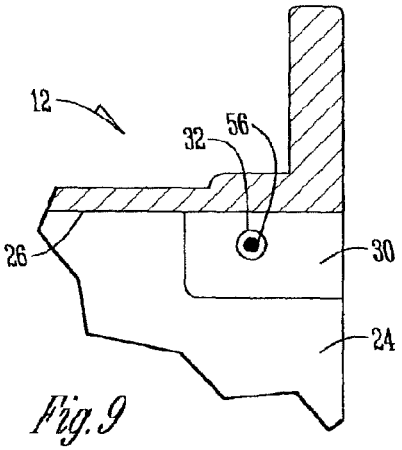
FIG. 9 is a partial elevational view of the cover attachment shoulder inside the housing.
Figure 10:
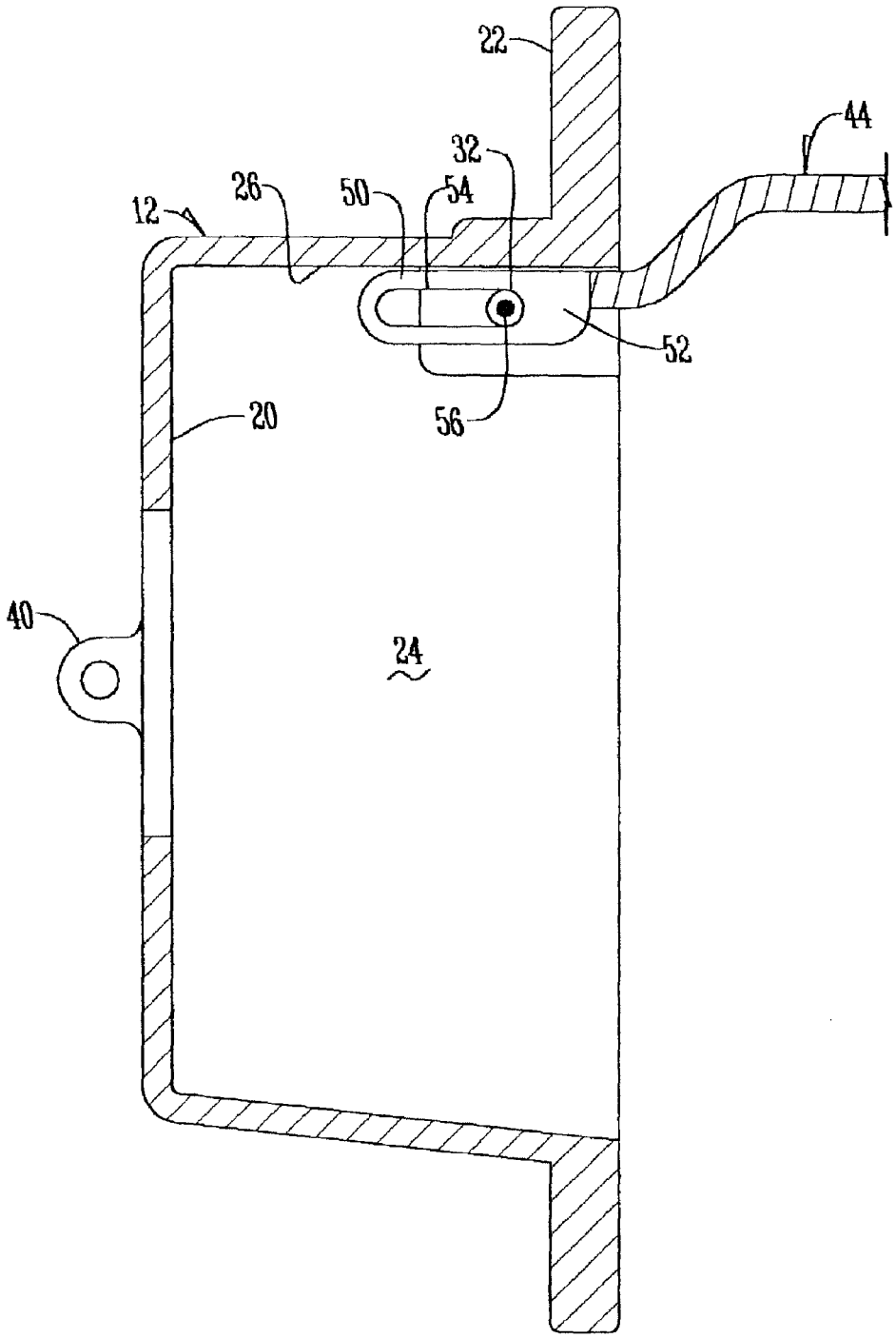
FIG. 10 is a vertical sectional view through the housing with the cover shown in the open and locked position.
Figure 11:
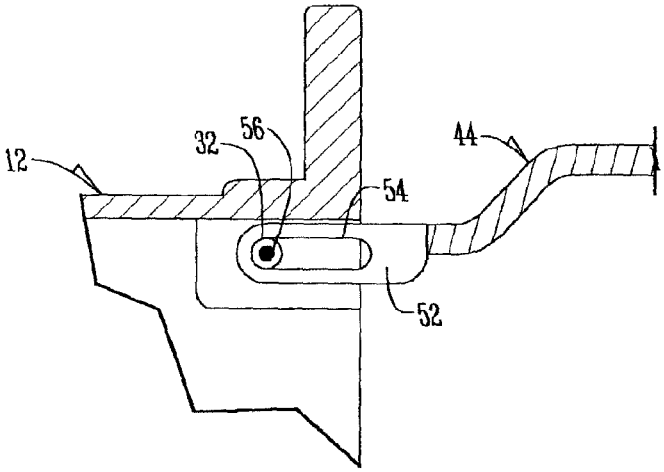
FIG. 11 is a partial sectional view similar to FIG. 9 but with the cover shown in the open and unlocked position.
Figure 12:
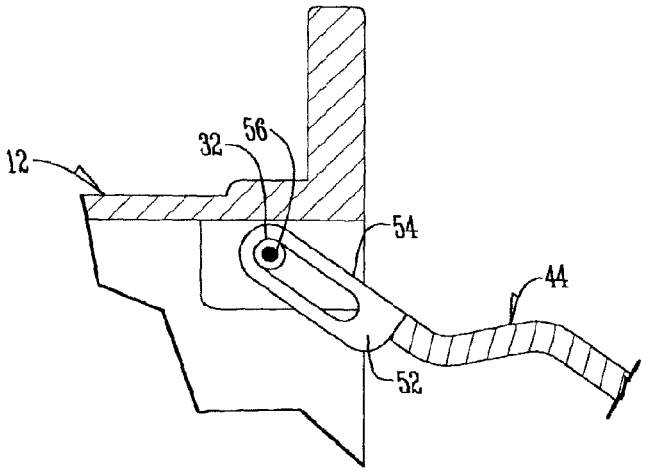
FIG. 12 is a view similar to FIG. 11 but with the cover shown in an intermittent position between being open or closed.
Figure 13:
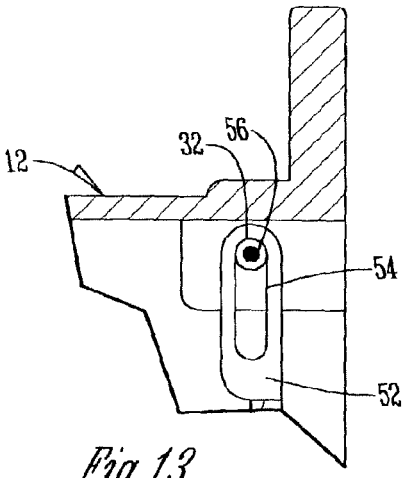
FIG. 13 is a view similar to FIG. 12 but with the cover shown in the closed position.

Cover 44 attaches to housing 12 and is retained by pins 56. As shown in FIG. 9, pins 56 extend through pin bores 32 on housing 12. Pins 56 also extend through slot 54 of cover 44 (FIGS. 10-13). In FIG. 10, cover 44 is locked in the upright or open position. Specifically, the hinge portion 50 of cover 44 cantilevers about pin 56 and pushes against interior top surface 26 of housing 12. To close the cover 44, the cover 44 must first be pulled away from housing 12, as shown in FIG. 11. Pulling the cover 44 away from the housing 12 causes the slot 54 of cover 44 to slide with respect to the pin 56. When the cover 44 is fully retracted from the housing 12, it will pivot about pin 56, as shown in FIG. 12. Interior top surface 26 is contoured such that the hinge portion 50 of cover 44 can freely pivot without interfering with the housing 12. Cover 44 can then pivot about pin 56 until reaching the closed position, as shown in FIG. 13. Cover 44 will press against cover stops 34 inside the housing 12 when the cover 44 is in the closed position. A locking device (not shown) can then be inserted into lock bore 48 of cover 44 to engage with lock bore 36 of housing 12 to lock cover 44 in the closed position. Locking may be necessary to prevent unauthorized access to the hydrant mounted inside the housing assembly 10.

Figure 14:
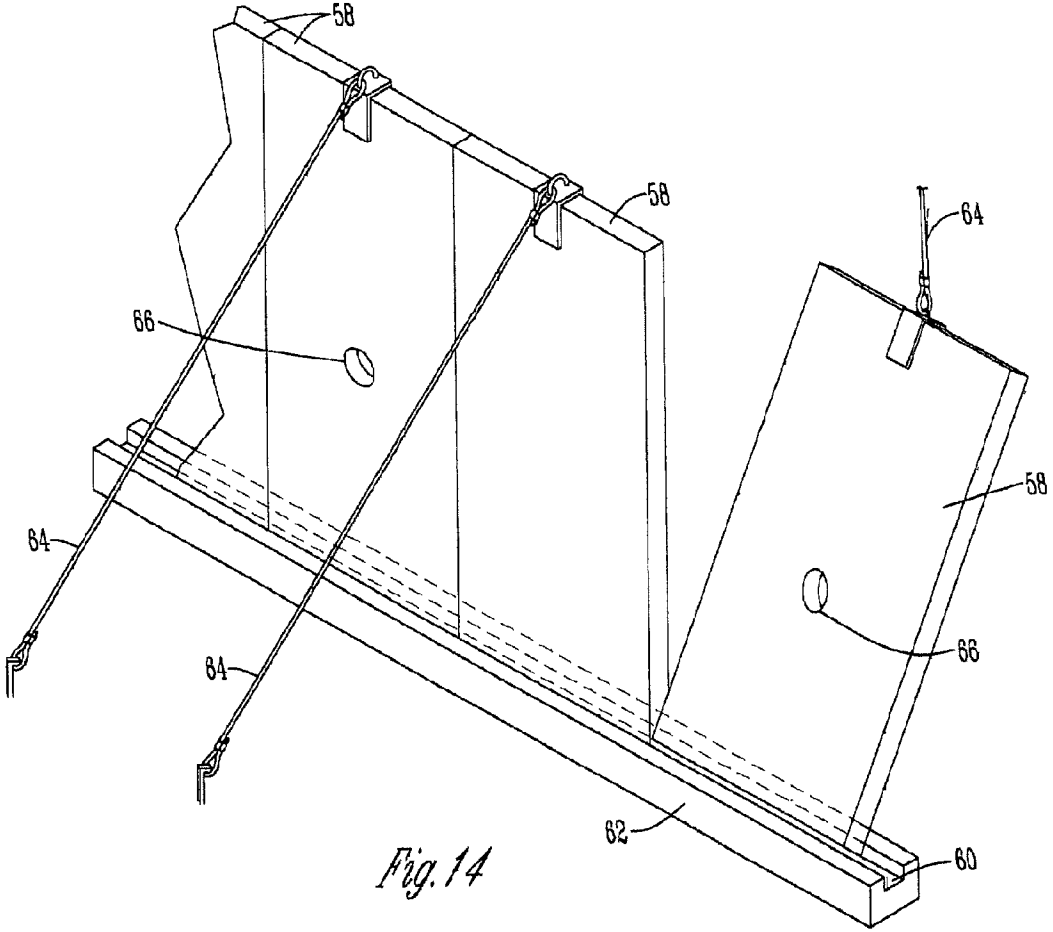
FIG. 14 is a perspective view of a tilt-up wall assembly adapted for use with the present invention.
Figure 15:
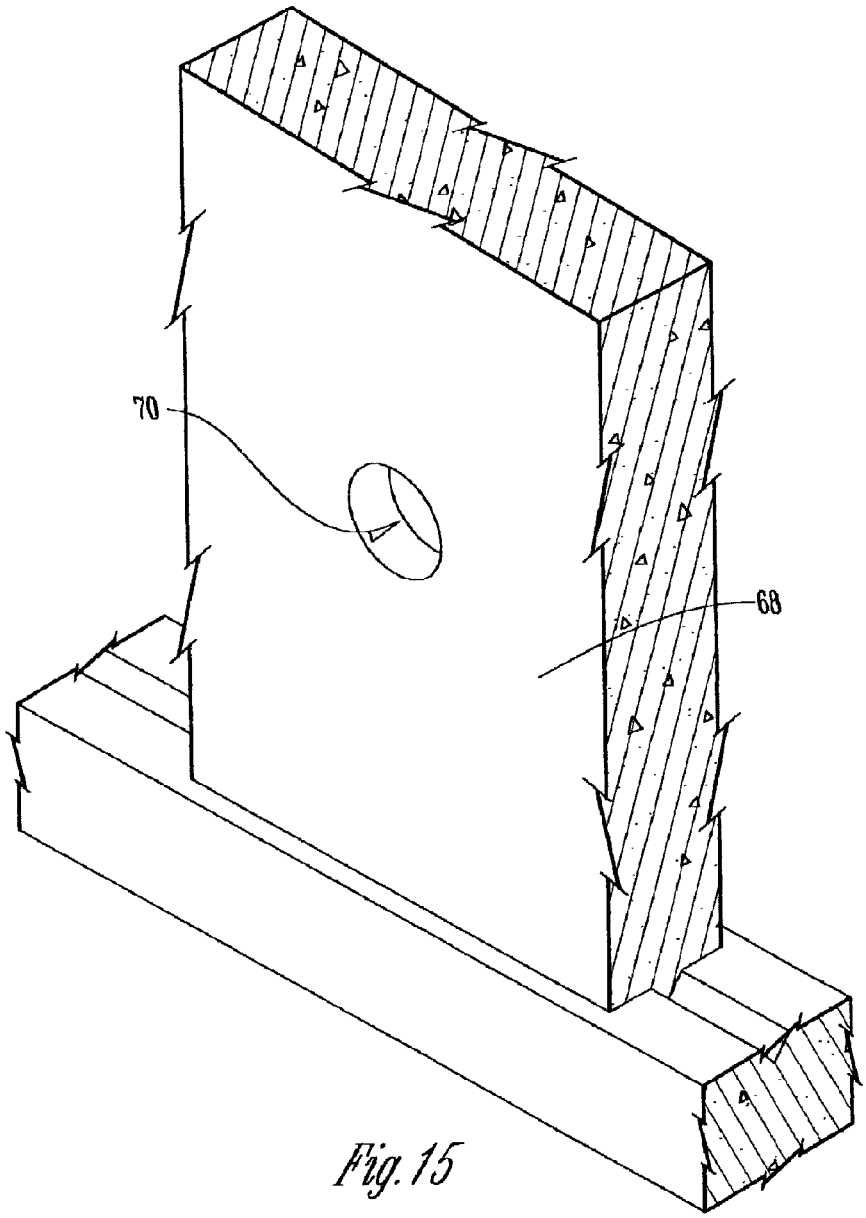
FIG. 15 is a perspective view of a poured concrete wall adapted for use with the present invention.

Housing assembly 10 can be used with tilt-up concrete wall construction, as shown in FIG. 14. In tilt-up construction, a pre-cast concrete panel 58 is inserted into a groove 60 in concrete base 62. A cable 64 is secured to panel 58 and is used to raise panel 58 into position. After all panels 58 are raised, a cap (not shown) is secured to the top ends of the raised panels. A hole 66 is drilled into concrete panel 58 to allow for installation of the housing assembly 10. Hole 66 typically is placed a specific height from the ground. As such, hole 66 can be drilled prior to the panel being installed or into an existing panel already installed. Housing assembly 10 may also be used with poured concrete walls, as shown in FIG. 15. Poured concrete wall 68 may be drilled to form hole 70, which accommodates the housing assembly 10.

Figure 16:
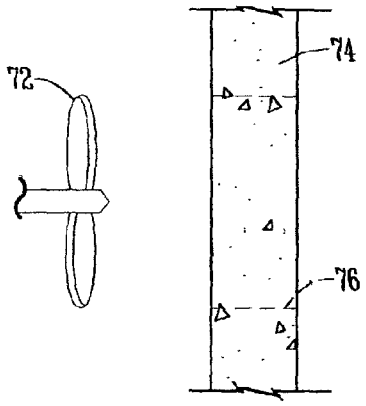
FIG. 16 is a sectional view of a concrete wall prior to being drilled for use with the present invention.
Figure 17:
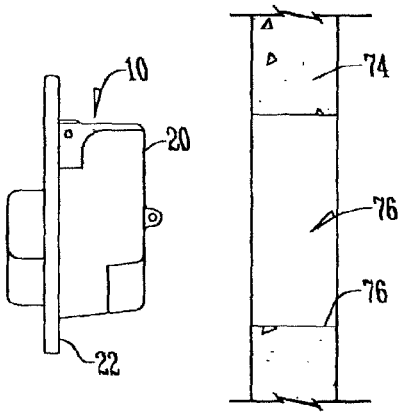
FIG. 17 is the side view of FIG. 16 adapted for use with the present invention.
Figure 18:
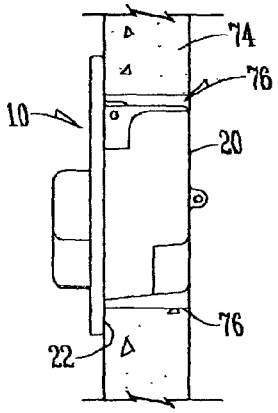
FIG. 18 is a view similar to FIG. 17 but with the hydrant housing properly installed in the wall.
Figure 19:
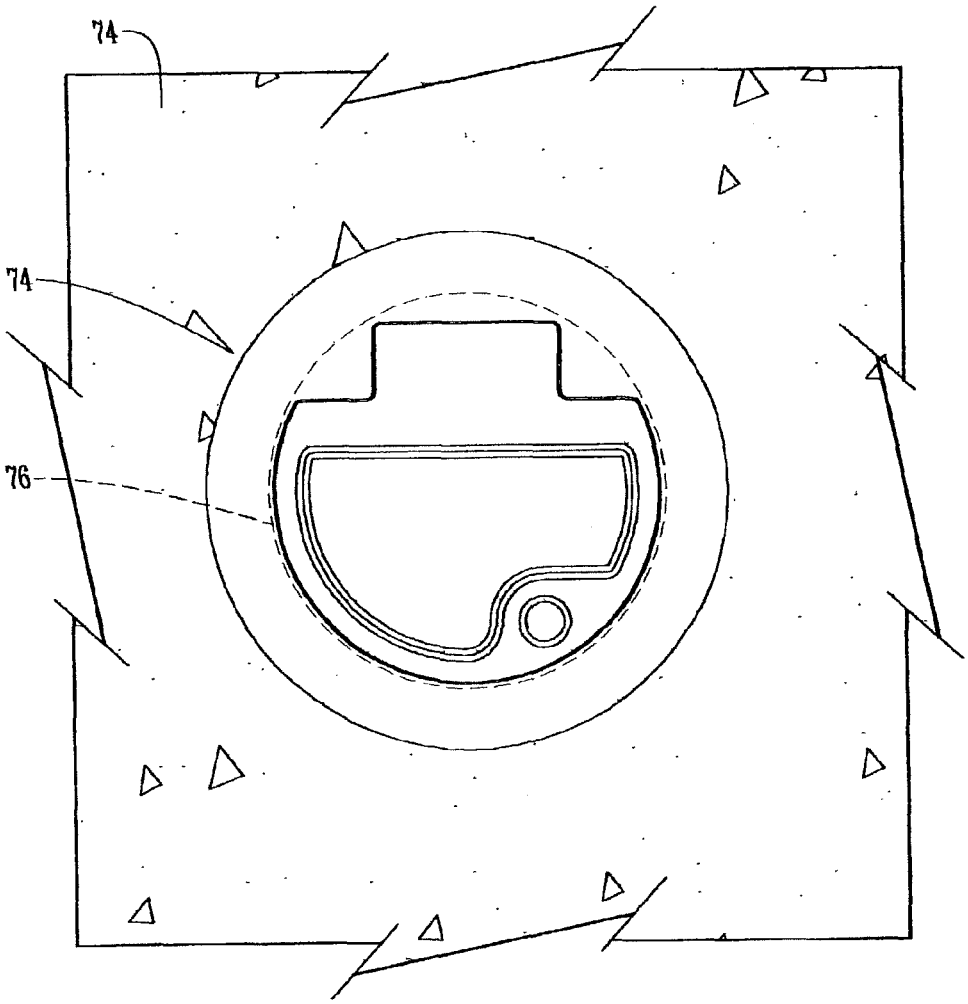
FIG. 19 is a front elevational view similar to the invention of FIG. 2 as installed in a concrete wall.
Figure 20:
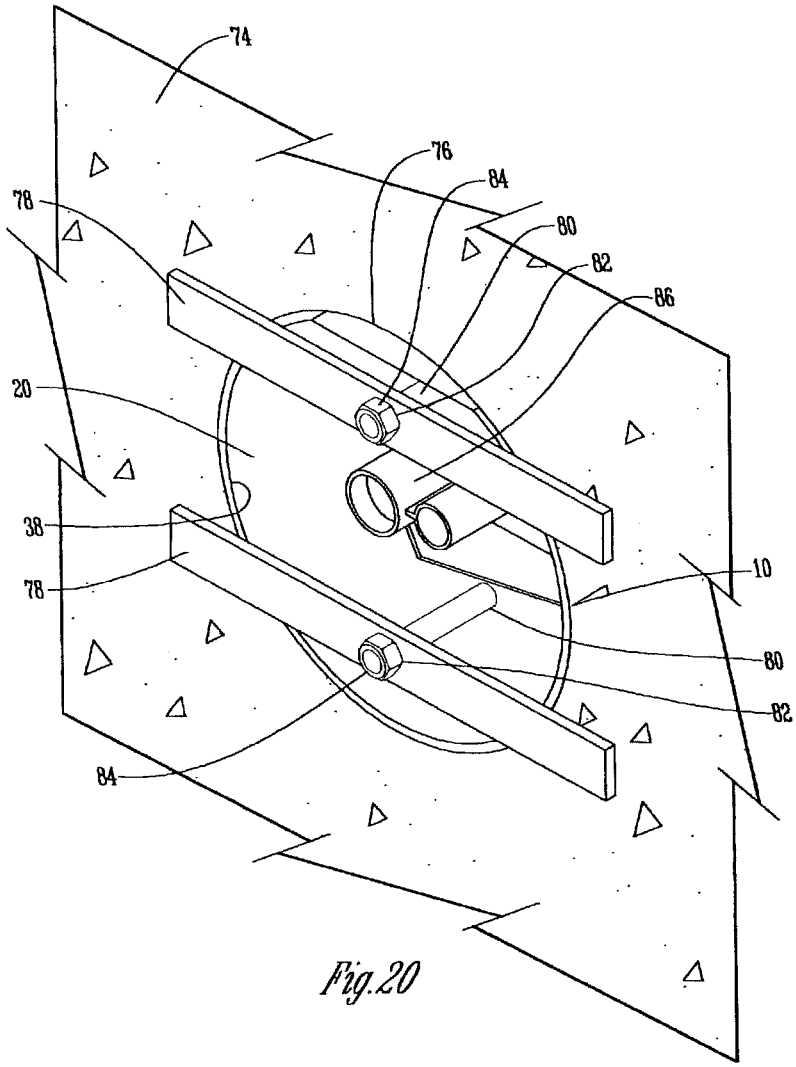
FIG. 20 is a rear elevational view of the housing opposite to FIG. 19 as installed in a concrete wall.

In either types of construction, the housing assembly 10 can be easily installed with a single drilling operation. As shown in FIGS. 16-18, drill 72 can be used to drill concrete wall 74 to create mounting hole 76. Mounting hole 76 is slightly larger in diameter than the diameter of rear surface 20 of housing 12, but smaller than the diameter of flange 22 of housing 12. Because the housing assembly 10 is of a round configuration, the wall 74 only needs to be drilled to accommodate the housing assembly 10. Unlike the prior art, no chiseling or chipping is required as there are no sharp corners to be made. After the hole 76 has been drilled in wall 74 (or the holes 66 in panels 58), the housing assembly 10 is inserted inside hole 76 such that the flange 22 is flush against the wall 74, as shown in FIGS. 18 and 19. With reference to FIG. 20, securing plates 78 may be attached to the rear surface 20 of the housing 12 such that the housing assembly 10 is securely mounted within wall 74. Securing plates 78 are of a length substantially larger than the diameter of hole 76. Threaded rods 80 screw into the mounting holes 42 in the rear surface 20 of housing 12. Securing plates 78 have centrally located holes 82 that are sized to fit over threaded rods 80. Nuts 84 secure to the ends of threaded rods 80 to tighten the securing plates 78 against wall 74.

Once installed into a wall, a hydrant 86 (FIG. 20) can then be mounted inside the housing assembly 10. Specifically, the hydrant 86 is inserted through the front of the housing assembly 10 such that the hydrant mounts against the interior rear surface 28 of the housing 12. The hydrant 86 is secured to the housing assembly 10 through attachment to lugs 40, which may be tapped to facilitate bolts. The plumbing (not shown) associated with the hydrant 86 extends out the rear side 20 of the housing assembly 10 through rear opening 38.

Whereas the invention has been shown and described in connection with the preferred embodiments thereof, it will be understood that many modifications, substitutions, and additions may be made which are within the intended broad scope of the following claims. From the foregoing, it can be seen that the present invention accomplishes at least all of the stated objectives.

What is claimed is:

1. An enclosure for a wall hydrant comprising:

a housing having a round configuration and having means for containing the wall hydrant;

a cover pivotally attached to the housing wherein [the] *said* cover can move from a closed position to an open position;

a slot within [the] *said* cover wherein a portion of [the] *said* cover can slide about the slot into [the] *said* housing when [the] *said* cover is in the open position; and wherein [the] *said* cover has a domed portion to accommodate larger hydrants.

*2. The enclosure of claim 1, wherein said housing includes an interior rear surface adapted to receive the wall hydrant.*

*3. The enclosure of claim 1, wherein a side wall of said housing has a depth approximately equal to that of a concrete wall.*

*4. The enclosure of claim 1, further comprising an outwardly extending flange associated with an edge of said housing, said flange having an inner surface for engagement onto a wall; and*

*wherein said cover is pivotally associated with said flange.*

*5. The enclosure of claim 4 further comprising a slot within the cover wherein a portion of the cover can slide about the slot into the housing when the cover is in the open position.*

* * * * *